United States Patent
Chen et al.

(10) Patent No.: US 8,059,888 B2
(45) Date of Patent: Nov. 15, 2011

(54) SEMI-AUTOMATIC PLANE EXTRUSION FOR 3D MODELING

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1028 days.

(21) Appl. No.: 11/928,083

(22) Filed: Oct. 30, 2007

(65) Prior Publication Data
US 2009/0110327 A1 Apr. 30, 2009

(51) Int. Cl.
*G06K 9/00* (2006.01)
(52) U.S. Cl. .................................... 382/154; 345/419
(58) Field of Classification Search .................. 382/154, 382/128, 130, 131, 132; 345/419, 420
See application file for complete search history.

(56) References Cited

U.S. PATENT DOCUMENTS

| | | | |
|---|---|---|---|
| 5,475,422 A | 12/1995 | Mori et al. | |
| 6,009,198 A | 12/1999 | Syeda-Mahmood | |
| 6,308,144 B1 * | 10/2001 | Bronfeld et al. | 703/2 |
| 6,668,082 B1 | 12/2003 | Davison et al. | |
| 6,704,439 B1 * | 3/2004 | Lee et al. | 382/131 |
| 6,718,062 B1 | 4/2004 | Zhang et al. | |
| 6,912,293 B1 | 6/2005 | Korobkin | |
| 7,024,028 B1 * | 4/2006 | Bar Shalev | 382/131 |
| 7,199,793 B2 | 4/2007 | Oh et al. | |
| 7,379,573 B2 * | 5/2008 | Tomoda et al. | 382/128 |
| 2002/0164067 A1 | 11/2002 | Askey et al. | |
| 2004/0190775 A1 | 9/2004 | Miller | |
| 2004/0196282 A1 | 10/2004 | Oh | |
| 2005/0243084 A1 | 11/2005 | Smith et al. | |
| 2006/0245639 A1 | 11/2006 | Jiang et al. | |
| 2006/0274926 A1 * | 12/2006 | Singh et al. | 382/131 |
| 2008/0152205 A1 * | 6/2008 | Vaillant et al. | 382/132 |
| 2008/0188749 A1 * | 8/2008 | Rasche et al. | 600/443 |

OTHER PUBLICATIONS

Zlatanova, et al., "3D Object Reconstruction from Aerial Stereo Images", pp. 1-10, WSCG '98, Sixth Int. Conf. on Computer Graphics and Visualization, Feb. 1998.
Repenning, "Inflatable Icons: Diffusion-based Interactive Extrusion of 2D Images into 3D Models", pp. 1-8, Journal of Graphics, GPU & Game Tools, vol. 10, No. 1, 2005.
Gonzo, et al., "Photo-Realistic 3D Reconstruction of Castles with Multiple-Sources Image-Based Techniques", Jul. 2004, pp. 7.
"Canoma: Quickly create realistic 3D models from photographs", retreived at << http://www.canoma.com >> on Sep. 7, 2007, pp. 6.
Debevec, et al., "FAçADE: Modeling and rendering architecture from photographs: A hybrid geometry- and image-based approach", SIGGRAPH 2006, pp. 1-10.
"What is SketchUp?", retrieved at << http://www.sketchup.com/?section=product >> on Sep. 7, 2007, pp. 2.
"GeoTango", retrieved at << http://www.geotango.com >> on Sep. 2, 2007, p. 1.
"Software Modeling of Photo-Realistic 3D Objects and Measuring in 3D", retrieved at << http://imagemodeler.realviz.com/products/IM/index.php?language=EN >> on Sep. 7, 2007,REALVIZ S.A., 2007, p. 1.
Szeliski, "Stereo algorithms and representations for image-based rendering", Proc. British Machine Vision Conference, 1999, pp. 314-328.

* cited by examiner

*Primary Examiner* — Jon Chang

(57) ABSTRACT

In accordance with one or more aspects, a plane in a 3D coordinate system in which a 3D model is to be generated based on one or more 2D images is identified. A direction of extrusion for the plane is also identified. Additionally, a user identification of a region of interest on a 2D image is received and projected onto the plane. A location in the 3D model of the region of interest is then automatically identified by extruding the plane along the direction of extrusion until the region of interest in the plane matches a corresponding region of at least one of the one or more 2D images.

19 Claims, 4 Drawing Sheets

SEMI-AUTOMATIC PLANE EXTRUSION FOR 3D MODELING

BACKGROUND

Image-based modeling refers to the creation of a 3-dimensional (3D) model from multiple 2-dimensional (2D) images. One technique that is oftentimes used during image based modeling is the insertion of a plane into the 3D coordinate system so that the plane aligns with the multiple 2D images. This plane insertion can be difficult for users because manipulating planes within a 3D coordinate system using a mouse and keyboard can be very confusing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the semi-automatic plane extrusion for 3D modeling, a plane in a 3D coordinate system in which a 3D model is to be generated based on one or more 2D images is identified. A direction of extrusion for the plane is also identified. Additionally, a user identification of a region of interest on a 2D image is received. A location in the 3D model of the region of interest is then automatically identified by extruding the plane along the direction of extrusion until the region of interest in the plane matches a corresponding region of at least one of the one or more 2D images.

BRIEF DESCRIPTION OF THE DRAWINGS

The same numbers are used throughout the drawings to reference like features.

DETAILED DESCRIPTION

Semi-automatic plane extrusion for 3D modeling is discussed herein. The semi-automatic plane extrusion determines a location of a particular region of interest in a 3D model that is being generated based on multiple 2D images. A user initially selects a region of interest on a 2D image, and this region of interest is projected onto a plane in a 3D coordinate system. The plane is then moved along an extrusion direction with the region of interest on the plane being compared to corresponding regions in the multiple 2D images as the plane is moved. When the plane is moved to a location at which the region of interest on the 3D plane matches the corresponding regions in the multiple 2D images, that location is used as the location for that region of interest in the 3D model being generated.

Figure 1:
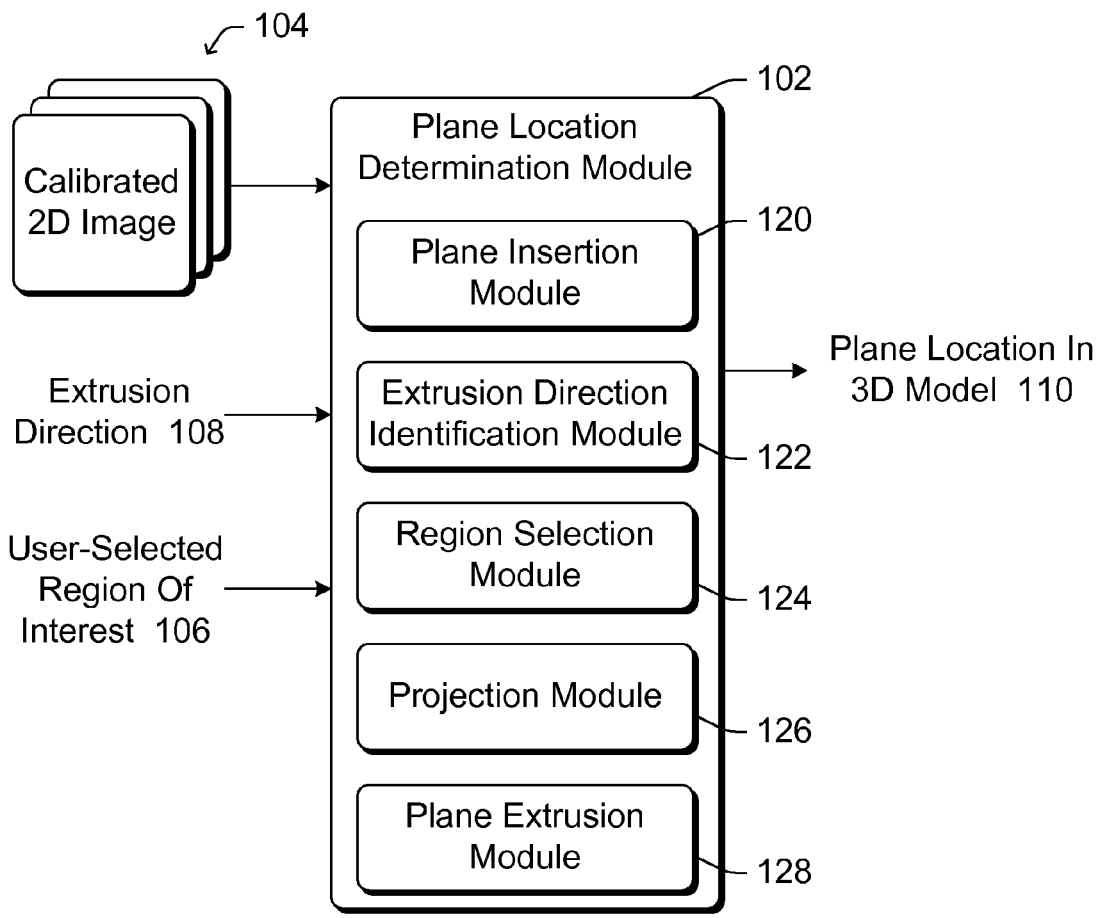
FIG. 1 illustrates an example system implementing one or more embodiments of the semi-automatic plane extrusion for 3D modeling discussed herein.

FIG. 1 illustrates an example system 100 implementing one or more embodiments of the semi-automatic plane extrusion for 3D modeling discussed herein. System 100 includes a plane location determination module 102 and multiple calibrated 2D images 104. Plane location determination module 102 receives as inputs one or more of the images 104, user-selected region of interest 106, and optionally an extrusion direction 108. Given these inputs, plane location determination module 102 generates a plane location in a 3D model 110.

Calibrated 2D images 104 include multiple 2D images. The images being calibrated refers to knowing a position and orientation for each of the images. In other words, it is known or can be readily determined where each image exists within a 3D coordinate system. This allows multiple 2D images to be used together to generate a 3D model in the 3D coordinate system. The images 104 can be obtained from any of a variety of different sources, such as a local database, a remote database, an image capture device, and so forth. The manner in which images 104 are created can also vary, such as capturing images from a still-image camera, a video camera, a satellite, and so forth. Images 104 can be obtained using any image capture device.

User-selected region of interest 106 is a region of interest that is identified by a user of system 100. During operation, a user of system 100 identifies a particular region that he or she is interested in. The user performs this identification on one of the 2D images 104. This region is typically a region corresponding to an object for which the user desires a 3D model to be built. For example, if the user desired to have a 3D model of a building built then he or she could select as the region of interest a rooftop of that building in one of the 2D images 104. By way of another example, if the user desired to have a 3D model of a building have a doorway that protrudes from the building, then he or she could select as the region of interest that doorway in one of the 2D images 104.

The user can input his or her desired region of interest in any of a variety of different manners. Typically the user is able to draw on a 2D image in order to identify his or her desired region of interest. This drawing can be done in different manners, such as by using a mouse, keyboard, or other cursor control device, by using a stylus, by using his or her finger to input the region using a touchscreen, and so forth.

The manner in which the user identifies a particular region can also vary. In one or more embodiments, the user outlines the region of interest using any of the drawing tools discussed above. Alternatively, other identification mechanisms can be used. For example, the user could simply draw a single stroke, draw a circle, mark an "X", add a checkmark, click on a location using a mouse or other cursor control device, and so forth. Given one or more of these indications, any of a variety of conventional detection mechanisms can be used to automatically detect the region that includes the user-indicated area. A variety of different detection mechanisms are well known to those skilled in the art and can be used to detect the regions, such as edge detectors, corner detectors, ridge and/or valley detectors, "blob" detectors, and so forth. For example, if the region of interest is a rooftop, the user can simply touch or click on any area within that rooftop on a 2D image. Conventional edge detection techniques can then be used to expand out from the touched or clicked location in order to identify the rooftop as the region of interest.

Plane location determination module 102 includes a plane insertion module 120, an extrusion direction identification module 122, a region selection module 124, a projection module 126, and a plane extrusion module 128. Plane insertion module 120 manages insertion of the plane into the 3D coordinate system. Module 120 can insert this plane automatically, or with assistance from the user as discussed in more detail below.

Extrusion direction identification module 122 determines the direction of extrusion for the inserted plane within the 3D coordinate system. Module 122 can determine this direction automatically, or with assistance from the user as discussed in more detail below.

Region selection module 124 includes one or more tools to assist the user in identifying region of interest 106. This can include, for example, drawing tools, edge detection routines, corner detection routines, and so forth.

Projection module 126 projects user-selected region of interest 106 onto the inserted plane. Plane extrusion module 128 extrudes the inserted plane along the extrusion direction to find a match between the region projected onto the inserted plane and one or more of the 2D images 104. The operation of plane location determination module 102 is discussed in more detail below.

Figure 2:
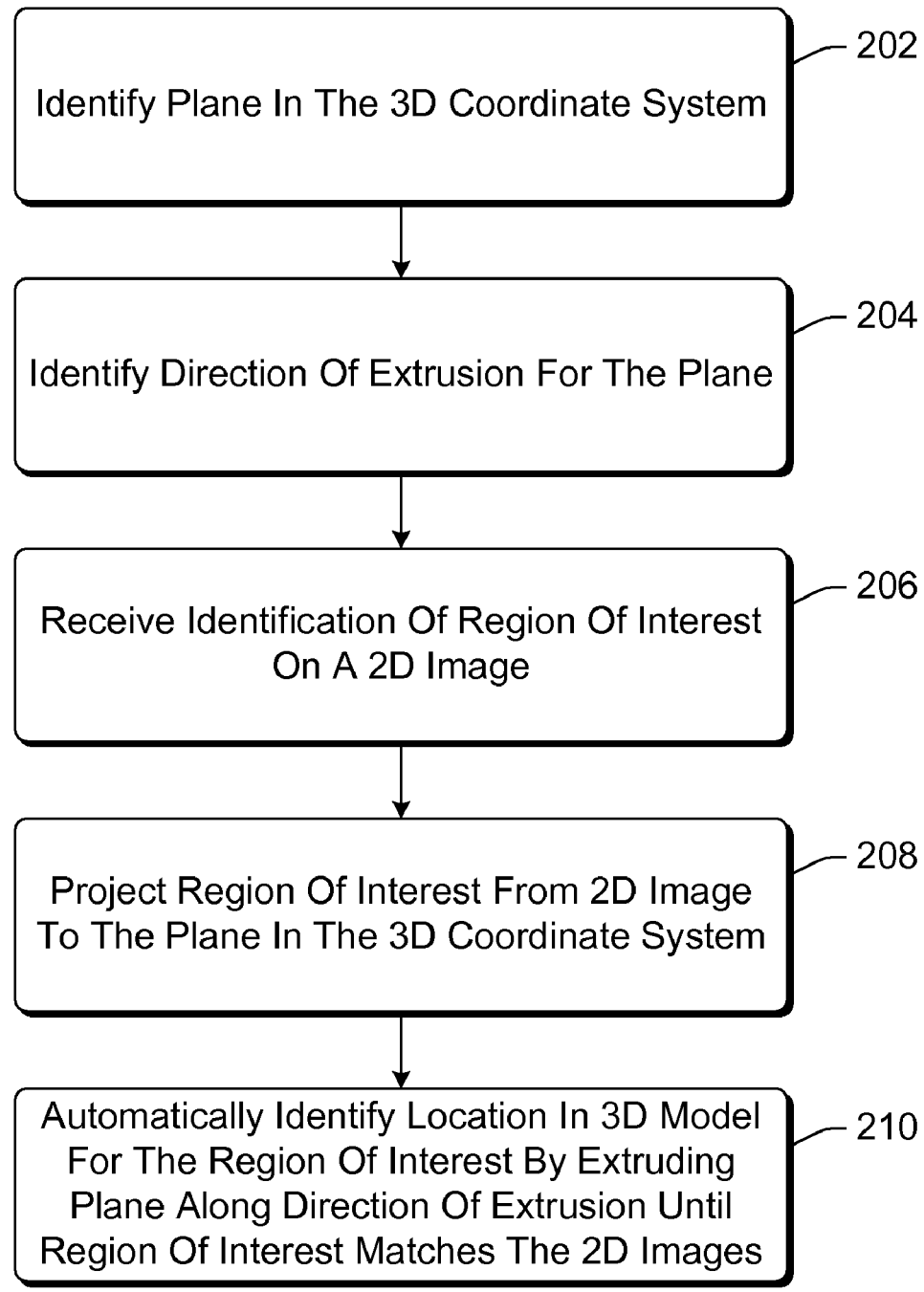
FIG. 2 is a flowchart illustrating an example process for semi-automatic plane extrusion for 3D modeling.

FIG. 2 is a flowchart illustrating an example process 200 for semi-automatic plane extrusion for 3D modeling. Process 200 is carried out by a device, such as a device implementing module 102 of FIG. 1, and can be implemented in software, firmware, hardware, or combinations thereof.

Initially, a plane in the 3D coordinate system is identified (act 202). In one or more embodiments, this plane is identified with user assistance. The user identifies an initial location for the plane in the 3D coordinate system, which is typically at the origin of the scene. The user need not be concerned with aligning the plane with portions of the 2D images, as that is performed automatically by the techniques discussed herein. The user can select any location for the plane, however the location and orientation of the plane is oftentimes selected so that the plane is approximately parallel to a plane in which the region of interest lies. For example, if the region of interest will be a doorway extruding from the front face of a building, then the plane is typically located and oriented such that the plane is approximately parallel with the front face of the building. The user can select the location and orientation for the plane using any of a variety of conventional input devices, such as a mouse, keyboard, stylus, and so forth.

Alternatively, in one or more embodiments the plane is automatically identified. This automatic identification can be performed when certain assumptions can be made regarding the 3D coordinate system and/or the 3D model being generated. For example, if the present techniques are being used in conjunction with mapping software, and the 3D models being generated are models of buildings, then the plane can be automatically identified as a plane parallel to the ground.

This automatic identification and/or identification with user assistance discussed in act 202 can be performed, for example, by plane insertion module 120 of FIG. 1.

Additionally, a direction of extrusion for the plane is also identified (act 204). In one or more embodiments, this direction of extrusion is identified with user assistance. The user can select any direction for the direction of extrusion, however the direction is oftentimes selected keeping in mind that the plane will be moved in this direction. So, the direction that is most likely to result in close matches to the region of interest which will be selected below and the corresponding regions of the 2D images is typically selected. Oftentimes the direction of extrusion is perpendicular to the plane identified in act 202, although it need not be perpendicular. The direction of extrusion can be a straight line, or alternatively a curved line. The user can select the location and orientation for the direction of extrusion using any of a variety of conventional input devices, such as a mouse, keyboard, stylus, and so forth.

Alternatively, in one or more embodiments the direction of extrusion can be automatically identified. This automatic identification can be performed when certain assumptions can be made regarding the 3D coordinate system and/or the 3D model being generated. For example, if the present techniques are being used in conjunction with mapping software, and the 3D models being generated are models of buildings, then the direction of extrusion can be automatically identified as perpendicular to the ground because buildings are assumed to be built up from the ground.

This automatic identification and/or identification with user assistance discussed in act 204 can be performed, for example, by extrusion direction identification module 122 of FIG. 1.

Figure 3:
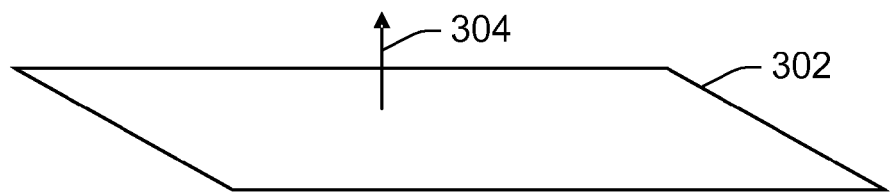
FIG. 3 illustrates an example of a plane and an extrusion direction.

FIG. 3 illustrates an example of a plane and an extrusion direction. In FIG. 3, a plane 302 and an extrusion direction 304 are shown. In the example of FIG. 3 the extrusion direction 304 is perpendicular to the plane 302. However, as discussed above the extrusion directions need not be perpendicular to the planes.

Returning to FIG. 2, an identification of a region of interest on a 2D image is also received (act 206). A user identifies a region of interest on a 2D image, as discussed above. The region of interest is then projected from the 2D image onto the plane in the 3D coordinate system (act 208). The plane in act 208 is the plane identified in act 202, and the 2D image in act 208 is the 2D image on which the region of interest was identified in act 206. The projection of a portion of a 2D image onto a plane in a 3D coordinate system is well known to those skilled in the art and thus will not be discussed further except as it pertains to the techniques discussed herein. This projection can be performed by, for example, projection module 126 of FIG. 1.

Figure 4:
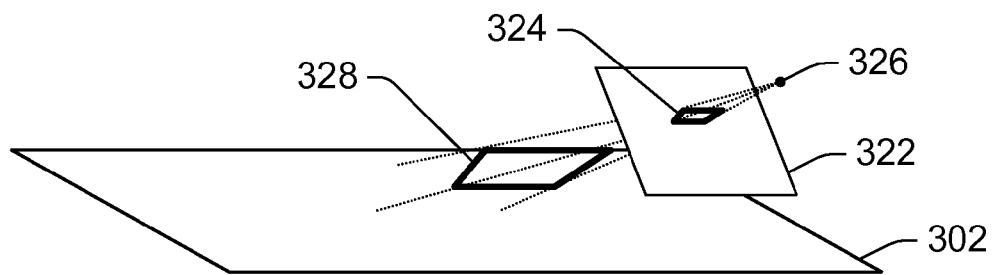
FIG. 4 illustrates an example of the projection of a region of interest from an image onto a plane in a 3D coordinate system.

FIG. 4 illustrates an example of the projection of a region of interest from an image onto a plane in a 3D coordinate system. FIG. 4 illustrates plane 302 as well as a 2D image 322. Image 322 has a region of interest 324 that has been identified thereon by the user. Based on a starting point 326, region of interest 324 can be projected onto plane 302 as region of interest 328 using any of a variety of conventional techniques. The point 326 is the center-of-projection of a camera associated with image 322. Extracting point 326 from an image using manual and/or automatic techniques is well known to those skilled in the art and thus will not be discussed further.

Returning to FIG. 2, the location in the 3D model for the region of interest is automatically identified (act 210). This identification is performed by extruding the plane identified in act 202 along the direction of extrusion identified in act 204 until the region of interest on the plane matches a corresponding region(s) of one or more of the 2D images. This identification can be performed, for example, by plane extrusion module 128 of FIG. 1. Once the location in the 3D model for the region of interest is identified, this location serves as the location for the portion of the 3D model corresponding to the region of interest. For example, if the region of interest is a rooftop, then this identified location serves as the location for the rooftop in the 3D model.

The region of interest on the plane in the 3D coordinate system corresponds to a region in each of one or more of the 2D images. For example, if the region of interest is a rooftop, then that rooftop will be present in one or more of the 2D images (e.g., of images 104 of FIG. 1). The region of a 2D image in which that rooftop is present is the region of the 2D image that corresponds to the region of interest on the plane. As the 2D images are calibrated, and the region of interest was initially identified with respect to one of the 2D images, the locations of these corresponding regions in the various 2D images can be readily determined.

In act 210, the plane is moved (also referred to as extruded) along the extrusion direction, and as it is moved the region of interest on the plane is compared to the corresponding regions of the 2D images. When a match is found between the region of interest on the plane and the corresponding regions of one or more of the 2D images, then the location for that region of interest in the 3D model has been identified.

A match between the region of interest on the plane and the corresponding regions of one or more of the 2D images can be determined in any of a variety of manners. A variety of different image matching metrics are well known to those skilled in the art, and any of these metrics can be used. For example, a sum of square differences between the region of interest on the plane and corresponding regions of the 2D images can be calculated, normalized cross-correlation techniques can be used, and so forth. The matching can be based in the color domain, gradient domain, or other domains.

In one or more embodiments a histogram of gradients technique is used to identify matches. To compute the histogram of gradients of an image, an edge detection filter (e.g., a Sobel edge detector or Gabor edge detector) is convolved over the image. Then, for each pixel in the image, a histogram of the edge directions is computed over the neighborhood of that pixel. Each pixel of the region of interest has this histogram of gradients. These histograms of gradients are compared via a dot product of the histogram vectors to determine if two regions of interest match.

The various image matching metrics provide a value indicating how closely the region of interest on the plane matches a corresponding region of a 2D image. In one or more embodiments, if this value exceeds a threshold value for at least one of the 2D images, then the location of the plane where the threshold value is exceeded is used as the identified location for the plane. In such embodiments, the region of interest on the plane matches the corresponding region of a single 2D image that is different from the image used for the user-selected region of interest 106. Alternatively, in one or more other embodiments the threshold value is exceeded by at least a threshold number of 2D images in order for that location of the plane to be used as the identified location for the plane. Alternatively, other techniques could be used, such as combining the values from the various 2D images and requiring a combined value to exceed a particular threshold, selecting only particular ones of the 2D images so that outlying values (e.g., those beyond a standard Gaussian distribution) are discarded, finding the closest match rather than relying on a threshold value to be exceeded, and so forth.

In one or more embodiments, the 2D image on which the region of interest was identified in act 206 is excluded from the 2D images used in the matching process of act 210. Alternatively, this 2D image could be included as one of the 2D images used in the matching process of act 210.

Once the location for this region of interest in the 3D model has been determined in act 210, the 3D model can be readily generated. Given this location, any of a variety of conventional techniques that are well known to those skilled in the art can be used to build the 3D model. The techniques discussed herein facilitate generation of or building of the 3D models by providing a semi-automatic technique for plane extrusion.

It should be noted that various modifications can be made to the identification process performed in act 210. In one or more embodiments, a distance threshold is employed beyond which the plane is not extended. In one or more other embodiments, the threshold value(s) for determining a match between the region of interest on the plane and a corresponding region(s) of the 2D image(s) can be reduced if a match cannot be found. In one or more other embodiments, if a match between the region of interest on the plane and a corresponding region(s) of the 2D image(s) exceeds a particular value (e.g., the threshold value or alternatively some other value) cannot be found, then the user can be notified that a match cannot be found. In one or more other embodiments, if a match between the region of interest on the plane and a corresponding region(s) of the 2D image(s) cannot be found, then the direction of extrusion may be changed (e.g., moved one degree) and the identification of act 210 repeated using this new direction of extrusion.

Figure 5:
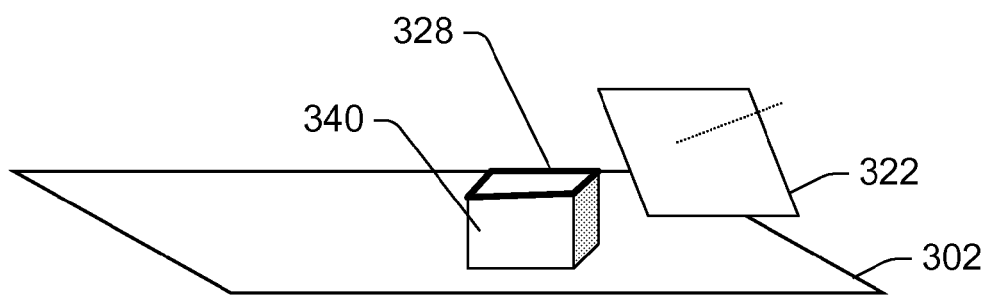
FIG. 5 illustrates an example of a 3D model having been built given the user-selected region of interest.

FIG. 5 illustrates an example of a 3D model having been built given the user-selected region of interest. FIG. 5 illustrates plane 302 and 2D image 322, as well as 3D model 340. In FIG. 5, the region of interest 328 has been extruded along the extrusion direction (direction 304 of FIG. 3) until a match to corresponding regions of the 2D images was found as discussed above.

Returning to FIG. 2, it should be noted that in one or more embodiments user input regarding the location along the extrusion direction that is to be identified can be received. For example, the user may attempt to position the plane at a location along the extrusion direction that he or she believes to be accurate. In such situations, the automatic identification of act 210 is still performed to verify the user's action. If the automatic identification determines that a different location results in a closer match of the region of interest in the plane to corresponding regions of the 2D images, then this different location can be used. In this manner, the user can identify an approximate location for the plane and then the automatic identification in act 210 "snaps" the plane to its proper location. Alternatively, rather than automatically snapping the plane to a different location, the user may be notified of this different location and given the option to select whether the plane is to be snapped to this different location.

FIG. 2 is discussed with reference to a single region of interest for a single 3D model. However, it is to be appreciated that these techniques can be repeated for multiple 3D models. For example, multiple regions of interest for multiple different buildings on a map may be selected by a user, and 3D models for each of these different buildings generated.

Additionally, it should be noted that objects can be segmented into multiple pieces. For example, a roof of a building may be sloped in such a way that it has two sides meeting at a peak. The user can identify each of these two sides as a different region of interest rather than identifying the entire roof as a single region of interest. The locations in the 3D model for these two regions of interest would then be determined individually using the techniques discussed above. By way of another example, a face of a building may have a doorway and multiple windows. The user can identify each of these windows and the doorway as separate regions of interest rather than having the entire face of the building treated as a single region. The locations in the 3D model for these window and doorway regions would then be determined individually using the techniques discussed above.

It should also be noted that different embodiments can be tailored to specific situations. For example, assume an application in which maps are displayed and the user can request that 3D models for buildings shown on the maps be generated. As discussed above, the location and orientation of the plane, as well as the extrusion direction, can be automatically identified. Thus, during operation, the user could simply select an image of a rooftop on a map (e.g., outline the rooftop, use a mouse to right-click on the rooftop and bring up a menu with a "build model" option, etc.), and have the 3D model of the building with that rooftop generated.

By way of another example, process 200 of FIG. 2 can be repeated multiple times to build a particular 3D model. For example, the user could first identify the rooftop of a house as the region of interest and have a 3D model of the house generated. The user could then select individual windows, doors, chimneys, and so forth as different regions of interest to have the 3D model refined to further reflect those features, such as chimneys protruding out, bay windows protruding out, doorways being inset, and so forth.

It should be further noted that the matching metrics discussed above can further be used to identify areas within the region of interest where the plane approximation is poor. Those locations will show larger discrepancies, indicating that those locations do not match the corresponding region of the 2D image as well as other parts of the region of interest. For example, assume that a user is fitting a plane to a roof, and there is an elevator shaft on the roof. The area where that elevator shaft is will show relatively large discrepancies (relative to the other areas of the region of interest) between the different views. These areas with larger discrepancies can be identified to the user, such as using different colors, to suggest to the user areas where he or she can further refine his or her 3D model. For example, continuing with the previous example, the user could select the elevator shaft as the next region of interest.

Figure 6:
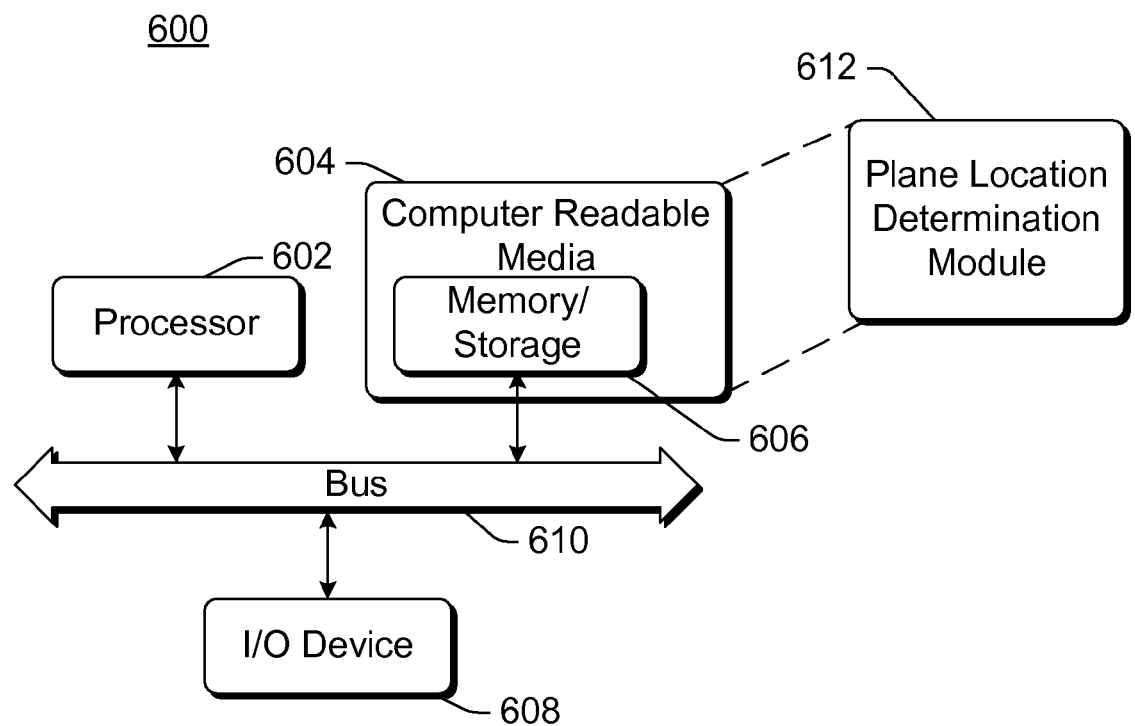
FIG. 6 illustrates an example computing device that can be configured to implement the active semi-automatic plane extrusion for 3D modeling in accordance with one or more embodiments.

FIG. 6 illustrates an example computing device 600 that can be configured to implement the active semi-automatic plane extrusion for 3D modeling in accordance with one or more embodiments. Computing device 600 can implement any of the techniques and processes discussed herein.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

In one or more embodiments, computer readable media 604 has stored thereon a plane location determination module 612 to implement the semi-automatic plane extrusion for 3D modeling discussed herein. Module 612 can be, for example, module 102 of FIG. 1. Plane location determination module 612 includes instructions that are accessed by processor 602 via bus 610. When executed by processor 602, these instructions cause processor 602 to carry out the semi-automatic plane extrusion for 3D modeling techniques discussed herein. It is to be appreciated that, during execution of plane location determination module 612, different instructions can be stored in different components of computing device 600, such as in processor 602, in various cache memories of processor 602, in other cache memories of device 600 (not shown), on other computer readable media, and so forth.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the semi-automatic plane extrusion for 3D modeling techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors, cause the one or more processors to:

identify a plane in a 3D coordinate system in which a 3D model is being generated based on one or more 2D images;
identify a direction of extrusion for the plane;
receive a user identification of a region of interest on a 2D image;
project the region of interest from the 2D image onto the plane; and
automatically identify a location of the region of interest in the 3D model by extruding the plane along the direction of extrusion until the region of interest in the plane matches a corresponding region of at least one of the one or more 2D images.

2. One or more computer storage media as recited in claim 1, wherein to automatically identify the location is to automatically identify the location of the region of interest in the 3D model by extruding the plane along the direction of extrusion until the region of interest in the plane matches the corresponding region of a single 2D image of the one or more 2D images, the single 2D image being different than the 2D image on which the user identification of the region of interest is received.

3. One or more computer storage media as recited in claim 1, wherein to automatically identify the location is to receive a user indication of a first location along the direction of extrusion, and then move the plane along the direction of extrusion to determine if the region of interest in the plane more closely matches the corresponding region of at least one of the one or more 2D images at a second location.

4. One or more computer storage media as recited in claim 1, wherein to receive the user identification is to receive an indication of an outline drawn on the 2D image to define the region of interest on the 2D image.

5. One or more computer storage media as recited in claim 1, wherein to identify the plane is to identify the plane automatically, and wherein to identify the direction of extrusion is to identify the direction of extrusion automatically.

6. One or more computer storage media as recited in claim 1, wherein to identify the plane is to receive a user indication of a location of the plane, and wherein to identify the direction of extrusion is to receive a user indication of the direction of extrusion.

7. One or more computer storage media as recited in claim 1, wherein the plane matches the corresponding region of at least one of the one or more 2D images if a value representing how well the plane matches a corresponding region of one of the one or more 2D images exceeds a threshold value.

8. A method of identifying a location of a portion of an object in a 3D model, the method comprising:
receiving a user input identifying a region of interest on a 2D image;
projecting the region of interest from the 2D image onto a plane in a 3D coordinate system in which the 3D model is being generated based on multiple 2D images; and
determining the location of the portion of the object by moving the plane along an extrusion direction until the region of interest on the plane matches a corresponding region of one or more of the multiple 2D images.

9. A method as recited in claim 8, further comprising:
receiving a user input identifying an initial location of the plane; and
receiving a user input identifying the extrusion direction.

10. A method as recited in claim 8, the determining comprising determining the location of the portion of the object by moving the plane along the extrusion direction until the region of interest on the plane matches a corresponding region of a single 2D image of one or more of the multiple 2D images, the single 2D image being different from the 2D image on which the user input identifying the region of interest is received.

11. A method as recited in claim 8, further comprising:
repeating the receiving, projecting, and determining for additional user-identified regions of interest.

12. A method as recited in claim 8, wherein the region of interest on the plane matches the corresponding region of one or more of the multiple 2D images at a location where the region of interest on the plane most closely matches the corresponding region of the one or more of the multiple 2D images.

13. A method as recited in claim 8, the determining comprising:
receiving a user input identifying a first location along the extrusion direction;
moving the plane along the extrusion direction to determine if the region of interest on the plane more closely matches the corresponding region of at least one of the one or more 2D images at a second location; and
using the second location as the location of the portion of the object if the region of interest on the plane more closely matches the corresponding region of at least one of the one or more 2D images at the second location.

14. A method as recited in claim 8, wherein receiving the user input identifying the region of interest on the 2D images comprises receiving an indication of an outline drawn on the 2D image.

15. A computing device comprising:
a processor; and
a computer readable media having stored thereon:
a projection module to project a user-selected region of interest on a 2D image onto a plane in a 3D coordinate system in which a 3D model is being generated; and
a plane extrusion module to automatically identify a location of the region of interest in the 3D model by moving the plane along an extrusion direction until the region of interest in the plane matches a corresponding region of at least one of one or more 2D images.

16. A computing device as recited in claim 15, the computer readable media having further stored thereon a region selection module to receive an indication from a user and automatically detect the region of interest based at least in part on the indication.

17. A computing device as recited in claim 16, wherein the region selection module is further to receive the indication marked on the 2D image, the 2D image being excluded from the at least one of the one or more 2D images.

18. A computing device as recited in claim 15, the computer readable media having further stored thereon:
a plane insertion module to automatically identify the plane in the 3D coordinate system; and
an extrusion direction identification module to automatically identify the extrusion direction.

19. A computing device as recited in claim 15, wherein the plane matches the corresponding region of at least one of the one or more 2D images if a value representing how well the plane matches a corresponding region of one of the one or more 2D images exceeds a threshold value.

* * * * *